(12) United States Patent
Raley

(10) Patent No.: US 9,041,714 B2
(45) Date of Patent: May 26, 2015

(54) APPARATUS AND METHOD FOR COMPASS INTELLIGENT LIGHTING FOR USER INTERFACES

(71) Applicant: Samsung Electronics Co. Ltd., Suwon-si, Gyeonggi-do (KR)

(72) Inventor: Christopher Reese Raley, Carrollton, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 13/756,077

(22) Filed: Jan. 31, 2013

(65) Prior Publication Data

US 2014/0210822 A1   Jul. 31, 2014

(51) Int. Cl.
  *G06T 15/00* (2011.01)
  *G06T 15/60* (2006.01)
  *G01C 21/36* (2006.01)
  *G06T 15/80* (2011.01)
  *G06T 17/05* (2011.01)

(52) U.S. Cl.
  CPC ............ *G06T 15/60* (2013.01); *G01C 21/3638* (2013.01); *G06T 15/80* (2013.01); *G06T 17/05* (2013.01); *G06T 2215/16* (2013.01)

(58) Field of Classification Search
  CPC ..... G06T 15/80; G06T 17/05; G06T 2215/16; G06T 15/60; A63F 13/00; G01C 21/3638
  USPC ............ 345/419, 426, 473; 382/104; 701/436
  See application file for complete search history.

(56) References Cited

U.S. PATENT DOCUMENTS

| | | | | |
|---|---|---|---|---|
| 5,870,098 | A  * | 2/1999  | Gardiner ........................ | 345/426 |
| 7,538,766 | B2 * | 5/2009  | Zhou et al. ..................... | 345/426 |
| 7,675,518 | B1 * | 3/2010  | Miller ............................ | 345/426 |
| 8,121,350 | B2 * | 2/2012  | Klefenz ........................ | 382/104 |
| 8,195,386 | B2 * | 6/2012  | Hu et al. ........................ | 701/436 |

\* cited by examiner

*Primary Examiner* — Phu K Nguyen
(74) *Attorney, Agent, or Firm* — Jefferson IP Law, LLP

(57) ABSTRACT

An apparatus and method for depicting one or more objects are provided. The method includes determining a geolocation of one or more objects, determining a vector from the objects to a light source, applying shading to the objects according to the vector, determining shadows cast by the objects according to the vector, and depicting the objects in the geolocation with one or more of the applied shading and the cast shadows.

32 Claims, 7 Drawing Sheets

APPARATUS AND METHOD FOR COMPASS INTELLIGENT LIGHTING FOR USER INTERFACES

BACKGROUND OF THE INVENTION

1. Field of the Invention

The present invention relates to an apparatus and method for compass intelligent lighting for user interfaces. More particularly, the present invention relates to an apparatus and method for adapting a user interface according to an environment of a user and an orientation of a device.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Many applications are now available for mobile terminals that include 3-Dimensional (3D) representations of objects, such as buildings in a map or in a navigation application, any character or object in a game application, etc. In this application, the term "3D" is used primarily to indicate a representation of a 3D object, for example, a building, on a display of a portable device such as a mobile terminal, and is not restricted to a context of a "true" 3D display that provides different video inputs to each of two eyes to give a stereoscopic effect to the viewer. However, the disclosed invention includes implementations on such 3D displays as well as on displays that present only a single image.

FIG. 1 is a mobile terminal according to the related art.

Referring to FIG. 1, the mobile terminal 100 is being used for navigation. Through various techniques of the related art, the location of the mobile terminal is determined and a display of directions includes a user's first-person view of the path ahead. In the navigation application, it is assumed in this example that the user is driving in a car or similar motor vehicle on a road. The road is in a mapped public area, and information regarding buildings along either side of the road is integrated into the navigation program to assist the user in recognizing the buildings and other objects as landmarks for navigation. In FIG. 1, the directions indicate the driver should turn left in 100 feet at Elm Street. If the user has difficulty following the written directions, for example, the user is unable to identify Elm Street by a road sign, or has poor visibility, or is not familiar with reading English, then the directions may still be understood by recognizing the environment where the directions indicate the user should turn. In FIG. 1, the user may recognize that the desired turn is at an intersection with shops on either side of the street near the user, and with houses on the right side of the street and a large building with a parking lot on the left side of the street after the intersection where the user should turn. Thus, the user will recognize the location more easily.

However, the related art is limited in that only a basic representation of known buildings is possible.

FIG. 2 is a mobile terminal according to the related art.

Referring to FIG. 2, the mobile terminal 200 is being used to play a game, for example, a football game. It is assumed in this example that the game involves objects flying through the air, for example, a football. The depiction of the flying objects in the game is enhanced by giving them shadows to show their relative position with respect to the ground plane in the game.

However, the related art is limited in that the shadows appear directly under the flying objects. It has not been possible to use external environment information to cast shadows in different directions.

Other depictions of objects are similarly limited in that shadows and realistic lighting have only been mimicked or usable in limited contexts.

Further, there has not previously been any way to combine various real world information to provide a user a more accurate, useful, and enjoyable depiction of objects and locations.

Accordingly, there is a need for an apparatus and method for providing an improved user interface according to an environment of a user and an orientation of a device.

SUMMARY OF THE INVENTION

Aspects of the present invention are to address at least the above-mentioned problems and/or disadvantages and to provide at least the advantages described below. Accordingly, an aspect of the present invention is to provide an apparatus and method for depicting objects using intelligent lighting for user interfaces.

In accordance with an aspect of the present invention, a method for depicting one or more objects is provided. The method includes determining a geolocation of one or more objects, determining a vector from the objects to a light source, applying shading to the objects according to the vector, determining shadows cast by the objects according to the vector, and depicting the objects in the geolocation with one or more of the applied shading and the cast shadows.

In accordance with another aspect of the present invention, a method for depicting one or more objects is provided. The method includes determining a size, shape, and relative location of each of one or more objects, determining a vector from the objects to a light source, determining at least one of a shading of an object and a shadow cast by the object according to the vector, determining an orientation of a display, and depicting the one or more objects with at least one of the shading and the shadow according to the orientation.

In accordance with yet another aspect of the present invention, a method for depicting one or more objects is provided. The method includes determining a geolocation of one or more objects, obtaining current environmental information of the geolocation, and depicting the objects in the geolocation according to the environmental information.

In accordance with still another aspect of the present invention, an apparatus for depicting one or more objects is provided. The apparatus includes a display and at least one controller for determining a geolocation of one or more objects, for determining a vector from the objects to a light source, for applying shading to the objects according to the vector, for determining shadows cast by the objects according to the vector, and for controlling to depict the objects on the display in the geolocation with one or more of the applied shading and the cast shadows.

In accordance with still yet another aspect of the present invention, an apparatus for depicting one or more objects is provided. The apparatus includes a display and at least one controller for determining a size, shape, and relative location of each of one or more objects, for determining a vector from the objects to a light source, for determining according to the vector at least one of a shading of one of the one or more objects and a shadow cast by the one of the one or more objects, for determining an orientation of the display, and for controlling to depict the objects on the display with at least one of the shading and the shadow according to the orientation.

In accordance with yet still another aspect of the present invention, an apparatus for depicting one or more objects is provided. The apparatus includes a display and at least one controller for determining a geolocation of one or more objects, for obtaining current environmental information of the geolocation, and for controlling to depict the objects on the display in the geolocation according to the environmental information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for adapting a user interface according to an environment of a user and an orientation of a device.

Applicant notes that although some of the exemplary embodiments herein are described using three dimensional (3D) examples, the present invention is not limited thereto. For example, exemplary embodiments of the present invention also include two-dimensional (2D) methods and apparatuses.

Figure 3:
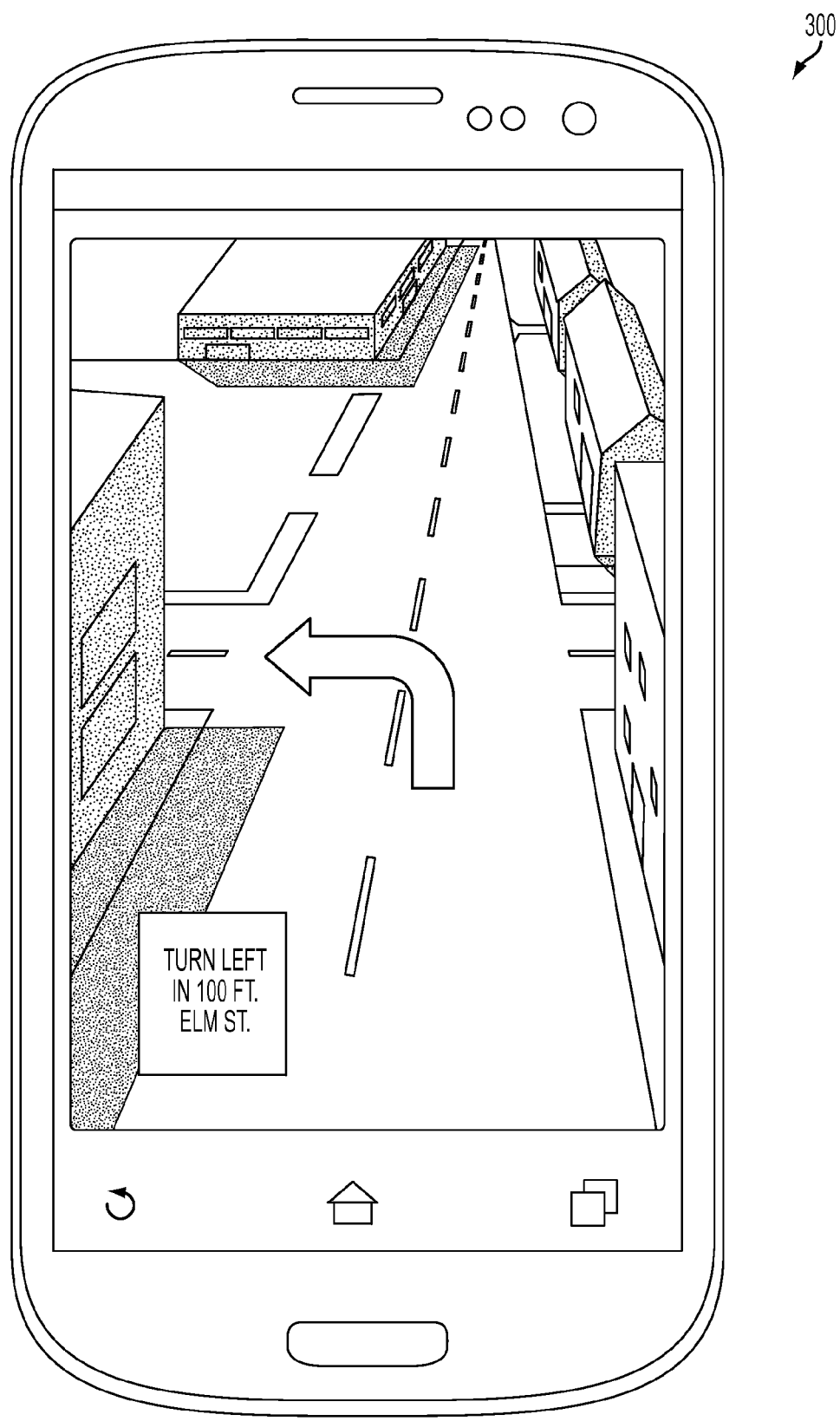
FIG. 3 is a mobile device according to an exemplary embodiment of the present invention.

FIG. 3 is a mobile device according to an exemplary embodiment of the present invention.

Figure 1:
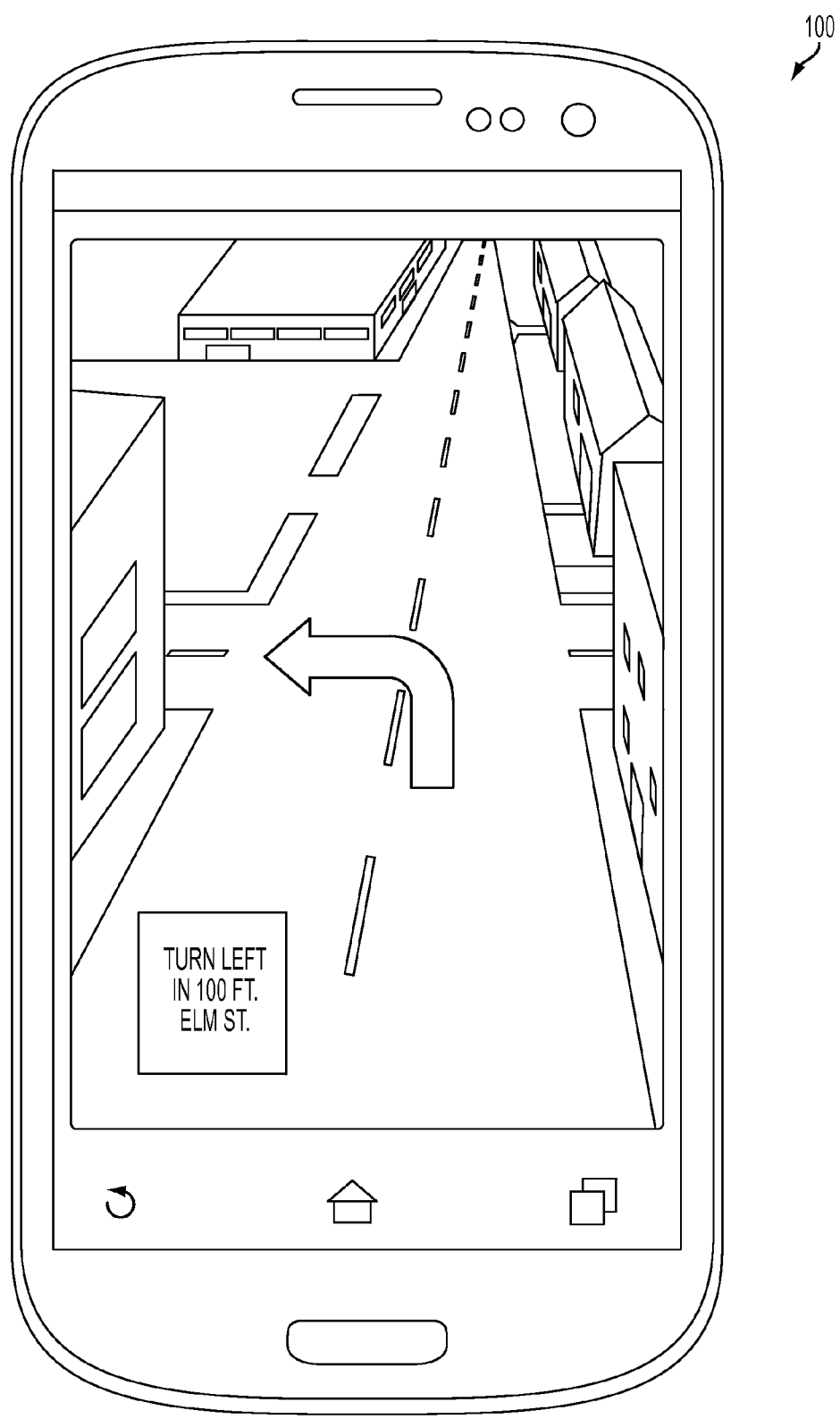
FIG. 1 is a mobile terminal according to the related art.
Figure 2:
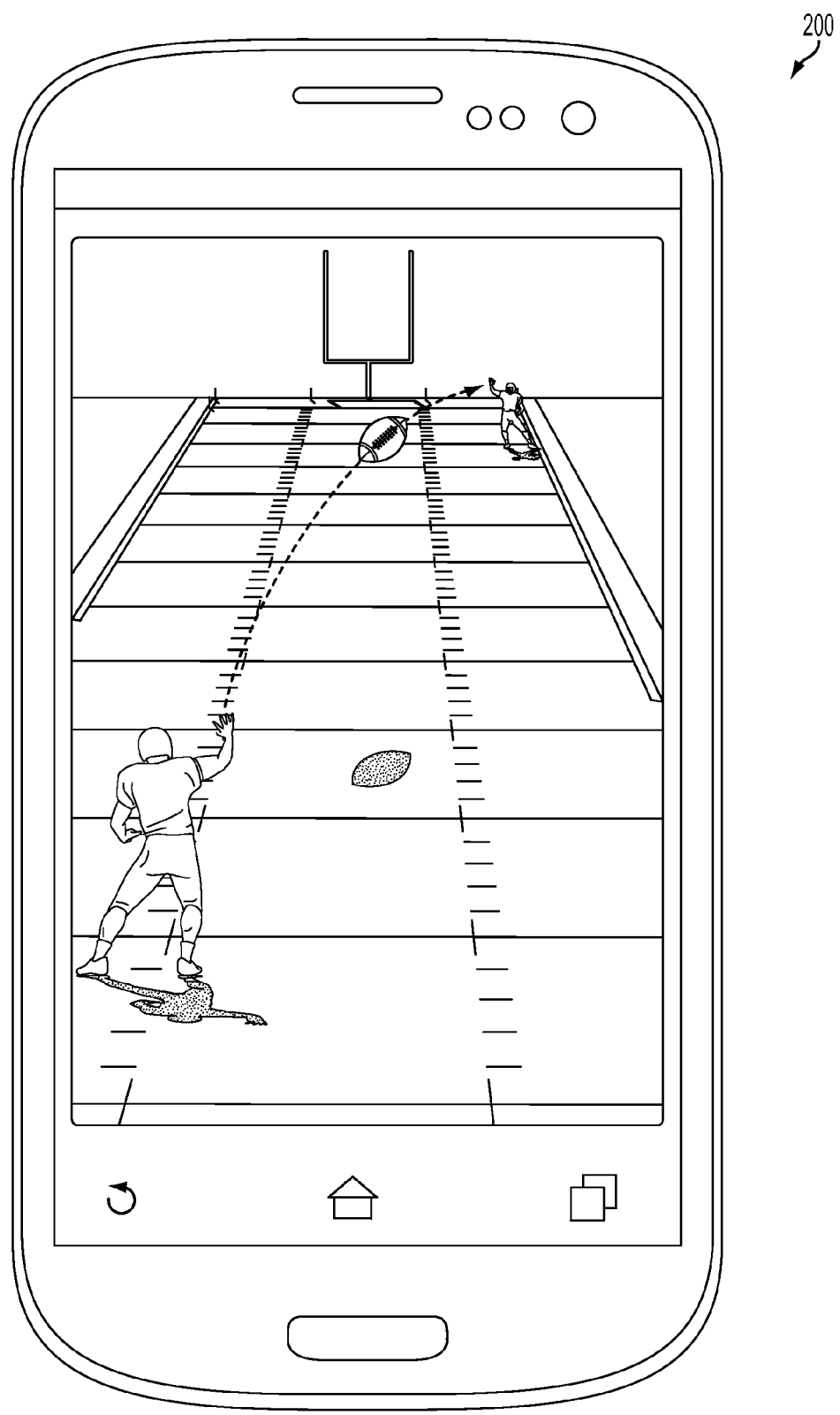
FIG. 2 is a mobile terminal according to the related art.

Referring to FIG. 3, a navigation application similar to FIG. 1 is being used. However, in FIG. 3, buildings cast shadows according to a position of a light source. It is assumed for this example that the user is traveling approximately southwest at a time around midday. Thus, the sun is located relatively high in the sky, ahead of the user and to the left. Building faces ahead of the user and to his left would be in shadow, and building faces to the right of the user and behind him would have sunlight illuminating them. Further, the buildings would cast shadows on the ground according to their size and shape and the relative location of the sun.

According to an exemplary embodiment of the present invention, objects in the real world are depicted with real time lighting and shadows according to the user's location and the local time and the orientation of the mobile device. Incidentally, in this application the terms "real world location" and geolocation will be used equivalently to indicate any identifiable location on Earth.

The user's location may be determined by any related-art technique. For example, the mobile device may be equipped with a Global Positioning System (GPS) satellite receiver. Alternatively, the mobile device may determine its location according to signal strengths of detected WiFi services, cellular phone access points, or any other signals that can be used to determine geolocation. The local time may be determined, for example, according to an internal clock that is periodically synchronized to a standard, or according to a time signal received wirelessly. With the geolocation and local time known, the position of celestial bodies such as the sun, moon, planets and stars can be determined. A brightest known light source, for example, the sun, can be used to determine illuminated sides of objects and cast shadows. The orientation of the mobile device is used to determine the direction or point of view of the user. The orientation may be determined from various related art techniques, for example, magnetic field sensors, gyroscopes, etc.

In the example of the user driving southwest at midday, after the user turns left he will be facing approximately southeast, and the relative position of the sun will be ahead and to the right. Then building faces behind him or to his left will be illuminated and building faces ahead or to his right will be in shadow. The size, shape, and direction of the cast shadows are determined and are depicted so as to duplicate the visible surroundings of the user. Shadows will be cast and depicted not only on the ground, but on any objects in the map database. For example, a tall building on one side of the street may cast its shadow on the front of a building on the opposite side of the street. Thus, the user is assisted in recognizing the environment, and his user experience is enhanced by realistically duplicating the lighting and shadow conditions.

In a variation of the above exemplary embodiment, the orientation of the device is not used. For example, a user in a rear-facing seat in a car may view the navigation instructions and see the forward view, regardless of which way the mobile device is oriented.

If a user is not following navigation instructions, he might use an application that depicts local buildings, businesses, etc., at a location and time according to a faced direction. Note that the location, time, and faced direction may be different from a current location, time, and faced direction. For example, a user investigating an accident may need to know the directions of the sun, shadows, etc., according to the time, location, and travel direction of a vehicle involved in the accident. Thus, the user can manipulate the display viewpoint to turn in a desired direction and view a 3-Dimensional (3D) depiction of the street ahead of the viewpoint, with information depicted according to a map database. If any of a location, time, or direction is not entered, then a current location, time, or direction will be used as appropriate.

In addition to the light and shadow information, exemplary embodiments of the present invention may also be configured to highlight information according to the user's input. In particular, if visibility of some information is likely to be poor due to light and shadow conditions, the information may be highlighted for the user. Alternatively, available information may be generally highlighted or displayed when determined light and shadow conditions are likely to be poor. The user may configure the device to display open restaurants near dusk, for example, and may turn with the mobile device until a highlighted open restaurant is depicted. For example, if the user is looking in a direction away from the sun, which would then be near the horizon, visibility is likely to be good; but if the user is looking in a direction towards the sun, visibility of everything in that direction is likely to be very poor. As the user turns, the mobile device will show the correct view from the viewpoint location in whichever direction the user determines.

As described above, the location of the light source is calculated from other information. However, the present invention is not limited thereto. For example, a mobile device equipped with at least one camera may determine the relative direction to a strongest light source by using sample video frames from the at least one camera. Thus, a device used indoors can determine the relative location of interior lighting and determine shadows accordingly.

In the above examples, the environment is constant and the mobile device physically moves in relation to the environment. However, the present invention is not limited thereto. In an exemplary embodiment, a depicted virtual object, for example, a sundial, may be depicted as being a predetermined distance from the mobile device. The sundial shadow is calculated in the above described manner. However, rather than depict a real world view, the sundial may be depicted according to the orientation of the mobile device. Thus, if the mobile device is held with the display horizontal, the sundial is depicted as viewed from directly above. If the mobile device is vertical with the back of the mobile device towards the north, the sundial will be depicted as viewed straight on from the south. If the mobile device is tilted with the back towards the west and downwards, the sundial will be depicted as viewed from the east and above.

In an exemplary embodiment of the present invention, environmental context information other than a light use is used to enhance a user's experience. For example, the mobile device can depict woods at a particular location. The mobile device can search for typical trees common to the location and depict them with or without leaves according to the date. For example, maple trees in the spring will be depicted with bright green new leaves, in the summer will be depicted with dark green foliage, in the fall will be depicted with red and yellow leaves, and in the winter will be depicted bare.

In an exemplary embodiment of the present invention, any environmental information that can be obtained can be integrated into the depicted scene. For example, local weather conditions can be obtained, including wind, rain, snow, temperature, cloud cover, etc. Thus, if strong winds are present, trees may be depicted swaying according to the wind direction and speed. If the strong winds are present in autumn, leaves of the appropriate color for common local trees may be depicted blowing in the wind. If rain, snow, or clouds are present, it may be determined that the sun will be obscured and no clear shadows are cast.

Figure 4:
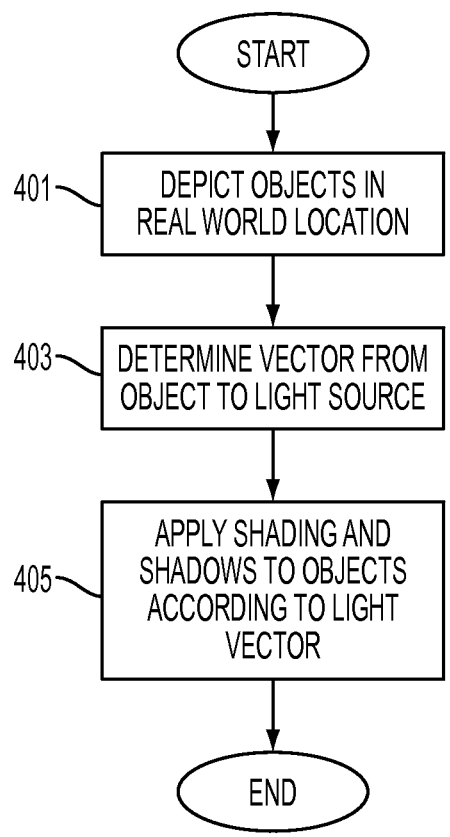
FIG. 4 is a flowchart of a method of depicting objects according to an exemplary embodiment of the present invention.

FIG. 4 is a flowchart of a method of depicting objects according to an exemplary embodiment of the present invention.

Referring to FIG. 4, in step 401 it is determined that one or more 3D objects are to be depicted by a mobile device in a real world location. Sizes, shapes, and locations with regard to the real world location are determined for the 3D objects. The locations of the one or more 3D objects may be determined from stable data, such as street addresses or latitude and longitude coordinates. Alternatively, the one or more 3D objects may be virtual objects that are only depicted in the real world location. The real world location may be determined, for example, by GPS signals, by obtaining information of identified wireless network access points, by entry of an address, etc. The real world location may also be the locale of a mobile device, for example, a device indoors which is unable to obtain signals to determine a geolocation. Methods of determining location can of course be combined for greater accuracy. The geolocation, if used, may be a present location of the device, although the present invention is not limited thereto. For example, a user may be reviewing navigation instructions to a destination.

In step 403 a vector from the one or more 3D objects to a light source is determined. If the real world location is outdoors, for example, the light source may be a celestial body such as the sun or moon that is visible at the location. The position of the sun or moon is calculated from the geolocation and the local date and time. If the location is unable to determine a geolocation, a brightest light source can be used. The brightest light source can be determined, for example, by sampling input from one or more cameras on the device. Methods of determining the light source can of course be combined for greater accuracy.

In step 405, shading and shadows are applied to the depicted 3D objects according to the vector to the light source.

Figure 5:
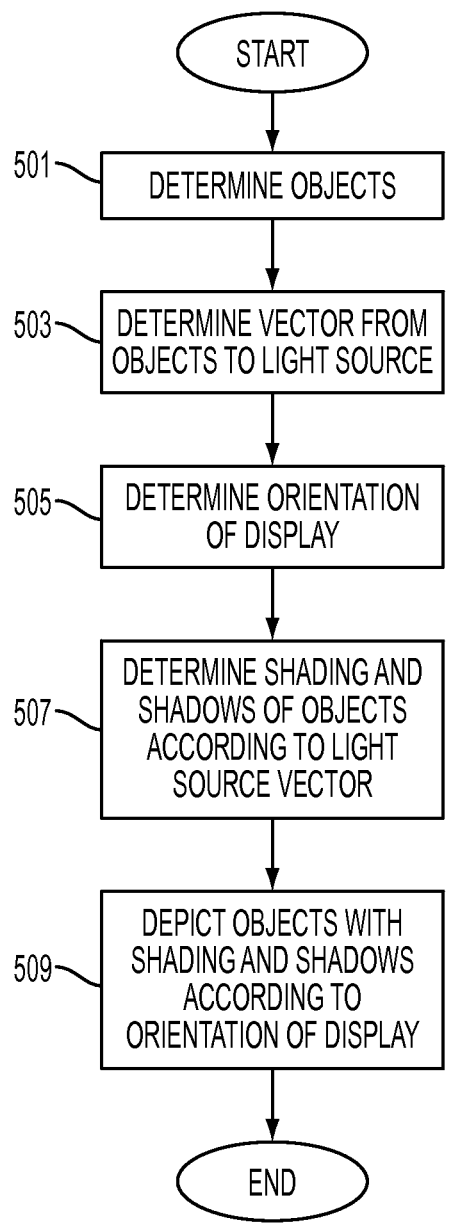
FIG. 5 is a flowchart of a method of depicting objects according to an exemplary embodiment of the present invention.

FIG. 5 is a flowchart of a method of depicting objects according to an exemplary embodiment of the present invention.

Referring to FIG. 5, it is determined in step 501 that one or more 3D objects are to be depicted. Sizes, shapes, and locations relative to each other are determined for the 3D objects. In step 503 a vector is determined from the one or more 3D objects to a primary light source.

In step 505 an orientation of the device is determined. For example, one or more magnetic sensors may be used to obtain information of the Earth's magnetic field, and the information may then be used with information of a geolocation of the device to determine a correction of the magnetic field vector and thereby determine an orientation of the device. Other methods can of course be used; for example, gyroscopes may be used to determine variance from a reference orientation. For another example, a controller may determine a horizon using an image from a camera, and determine the orientation therefrom. Methods of determining the orientation can of course be combined for greater accuracy.

In step 507 shading and shadows of the 3D objects are determined according to the vector to the light source. In step 509 the 3D objects are depicted with the shading and shadows according to the orientation of the display. For example, a sundial may be displayed and the orientation of the device can determine the point of view from which the sundial is seen. In this example, the orientation can be considered analogous to determining a viewpoint on a virtual sphere around the object. Alternatively, the orientation of the device might be used to determine a viewpoint from a real world location. For example, the user may display a shopping district of a town he plans to visit. The use would enter the location, and the viewpoint of the location (the shopping district) would vary according to the orientation of the device. Thus, the user could "look around" as if the device were controlling a camera at the location. In each direction depicted the 3D objects are shown with corresponding shading and shadows.

Figure 6:
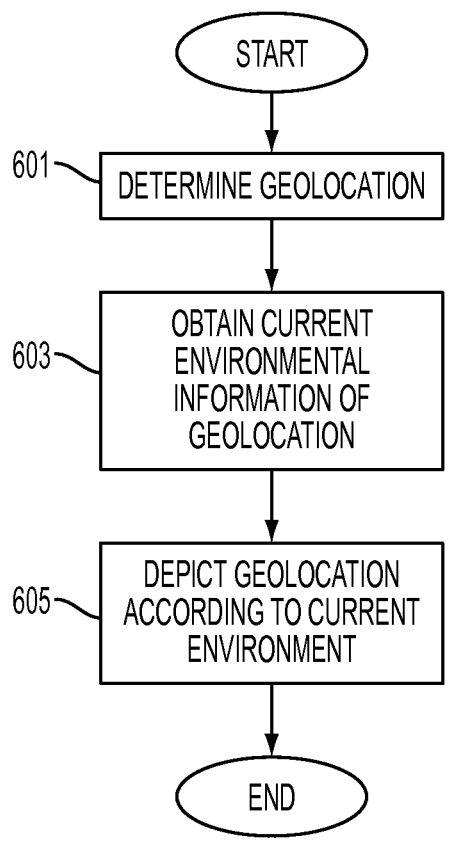
FIG. 6 is a flowchart of a method of depicting objects according to an exemplary embodiment of the present invention.

FIG. 6 is a flowchart of a method of depicting objects according to an exemplary embodiment of the present invention.

Referring to FIG. 6, a geolocation is determined in step 601. The geolocation may be determined or entered by any of various means known in the art, such as GPS, latitude and longitude coordinates, street address, etc.

In step 603, current environmental information for the geolocation is obtained. The environmental information could include, for example, information of date, time, temperature, wind speed and direction, cloud cover, precipitation, recent precipitation such as snowfall that may not have melted or rainfall that may render streets wet, common local flora, notices of road closures or maintenance work, etc.

In step 605 the geolocation is depicted according to the environmental information. For example, if it is determined that there has been 6 inches of snowfall in the past day with the temperature staying below freezing, the geolocation may be depicted as snow covered. If it is determined that a wooded area is visible, foliage thereof may be determined according to the date and common trees for the geolocation. If the information indicates an overcast sky, the rendering of shadows may be suppressed. If the wind speed is greater than de minimus, trees swaying or dropped leaves blowing may be depicted, as appropriate. If precipitation is currently falling, it can be depicted. There is no inherent limit on what type of information may be obtained and used in the depiction of the geolocation.

Figure 7:
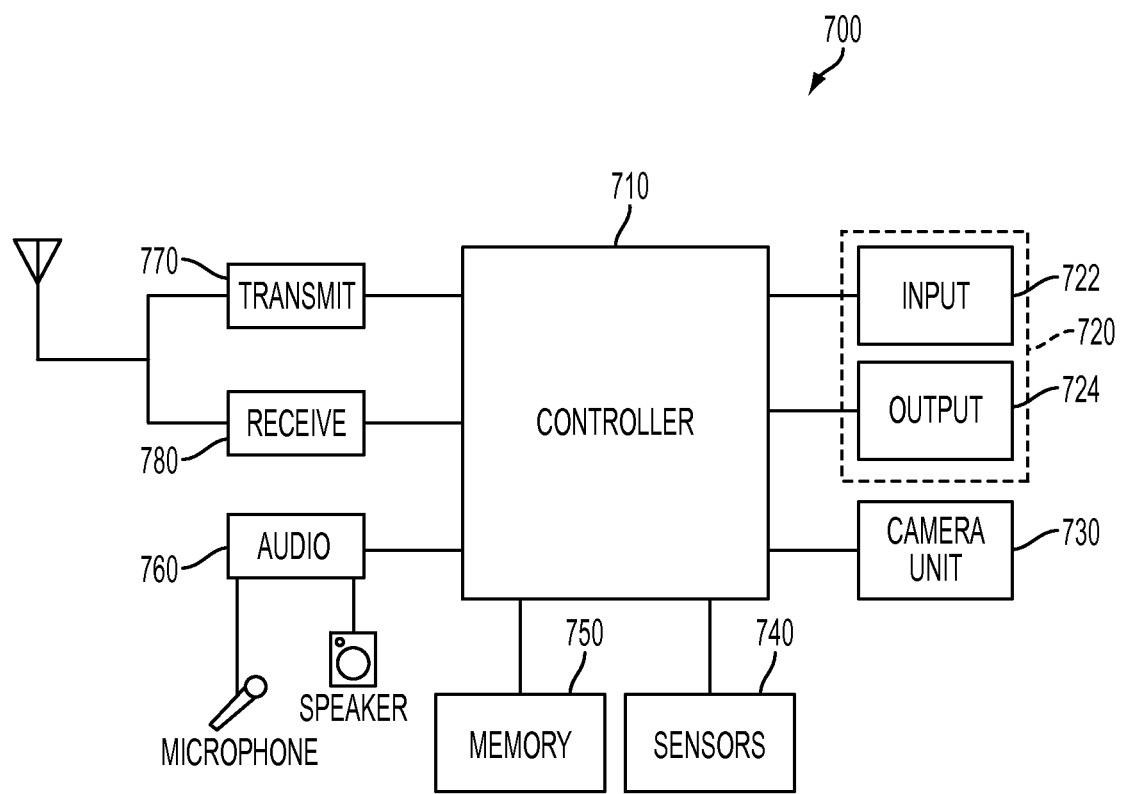
FIG. 7 is a block diagram of a mobile device according to an exemplary embodiment of the present invention.

FIG. 7 is a block diagram of a mobile device according to an exemplary embodiment of the present invention.

Referring to FIG. 7, the mobile device 700 will include at least one controller 710 which will control the functions and operations of the device. Although one controller 710 is depicted, the present invention is not limited thereto. For example, specialized controllers might be provided with each functional module of the mobile device 710. The controller 710 controls the device to perform the above described functions.

An input unit 722 receives input from a user. An output unit 724 displays output to the user. The input unit 722 and output unit 724 may be combined as a touchscreen 720, although the present invention is not limited thereto.

An optional camera unit 730 may be present and includes one or more cameras. If multiple cameras are present they may face different directions, or may face a same direction for stereoscopic imagery.

One or more optional sensors 740 may be included. The optional sensors 740 may include, for example, magnetic field sensors, heat sensors, proximity sensors, gyroscopes, thermometers, or any other sensors that obtain information of the environment of the device 700.

An optional memory 750, if present, will store software required for the operation of the device 700, and various data received or generated by use of the device 700. The memory may comprise any form of digital storage that the controller can read from or write to. One or more programs to perform the above described functions may be stored in the memory.

An optional audio processor 760 controls processing of sound, such as the encoding and decoding of audio information in digital form. A microphone MIC picks up audio information and provides it to the audio processor 760. A speaker SPK receives audio signals from the audio processor 760 and plays them.

One or more wireless transmitter 770 and wireless receiver 780 may optionally be provided and used for any form of wireless communication, for example, cellular telephone, WiFi, GPS reception, Bluetooth, etc.

Certain aspects of the present invention may also be embodied as computer readable code on a non-transitory computer readable recording medium. A non-transitory computer readable recording medium is any data storage device that can store data, which can be thereafter read by a computer system. Examples of the non-transitory computer readable recording medium include Read-Only Memory (ROM), Random-Access Memory (RAM), Compact Disc (CD)-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for depicting one or more objects by an electronic device comprising a display, the method comprising:
   determining, by the electronic device, a geolocation of the one or more objects;
   determining, by the electronic device, a location of a light source relative to the geolocation according to a date and time;
   determining, by the electronic device, a vector from the objects to the light source;
   applying shading to the objects according to the vector;
   determining, by the electronic device, shadows cast by the objects according to the vector; and
   depicting the objects in the geolocation with one or more of the applied shading and the cast shadows according to the geolocation, date, time, and a faced direction, wherein the geolocation, date, time, and faced direction of the depicting are determined independently of a current location, date, time, and faced direction of the electronic device.

2. The method of claim 1, wherein the light source comprises the sun or moon.

3. The method of claim 2, wherein the determining of the vector comprises determining a position in the sky of the light source according to the geolocation and a local date and time at the geolocation.

4. The method of claim 1, wherein the objects comprise at least one object known to be at the geolocation.

5. The method of claim 4, wherein the object comprises an immobile object.

6. The method of claim 1, wherein the determining of the geolocation is based on signals received by a Global Positioning System (GPS) receiver.

7. The method of claim 1, wherein the determining of the geolocation is based on information entered by a user.

8. The method of claim 1, wherein the determining of the vector comprises identifying a primary light source in at least one image obtained with at least one camera.

9. The method of claim 1, wherein the faced direction is determined based on at least one of a sensing of a magnetic field, a gyroscope, and a visual horizon.

10. The method according to claim 1, further comprising:
obtaining current environmental information of the geolocation; and
depicting the objects in the geolocation according to the current environmental information.

11. The method of claim 10, wherein the environmental information comprises at least one of a temperature, a wind direction, a wind speed, a date, a time, a current cloud cover, currently falling precipitation, recent precipitation, information of flora common to the geolocation, and information of road maintenance or closures.

12. The method of claim 11, wherein at least one object is depicted moving according to the wind direction and wind speed.

13. The method of claim 1, wherein one or more of the geolocation, date, time, and faced direction may be entered by a user.

14. The method of claim 13, wherein if any of the geolocation, date, time, and faced direction are not entered by the user, then the light source, shading, and shadows are determined according to the respective current location, date, time, or faced direction of the electronic device instead.

15. The method of claim 1, wherein the objects comprise at least one virtual object not known to be physically present at the geolocation, date, and time.

16. The method of claim 1, wherein at least one of the one or more objects is depicted highlighted according to criteria entered by a user.

17. An apparatus for depicting one or more objects, the apparatus comprising:
a display; and
at least one controller for determining a geolocation of one or more objects, for determining a location of a light source relative to the geolocation, for determining a vector from the objects to the light source, for applying shading to the objects according to the vector, for determining shadows cast by the objects according to the vector, and for controlling to depict the objects on the display in the geolocation with one or more of the applied shading and the cast shadows according to the geolocation, date, time, and a faced direction,
wherein the geolocation, date, time, and faced direction of the depicting are determined independently of a current location, date, time, and faced direction of the apparatus.

18. The apparatus of claim 17, wherein the light source comprises the sun or moon.

19. The apparatus of claim 18, wherein the controller determines a position in the sky of the light source according to the geolocation and a local date and time at the geolocation.

20. The method of claim 17, wherein the objects comprise at least one object known to be at the geolocation.

21. The apparatus of claim 20, wherein the object comprises an immobile object.

22. The apparatus of claim 17, wherein the controller determines the geolocation based on signals received by a Global Positioning System (GPS) receiver.

23. The method of claim 17, wherein the controller determines the geolocation based on information entered by a user.

24. The apparatus of claim 17, wherein the controller determines the vector by identifying a primary light source in at least one image obtained with at least one camera.

25. The method of claim 17, wherein the faced direction is determined based on at least one of a sensing of a magnetic field, a gyroscope, and a visual horizon.

26. The apparatus according to claim 17,
wherein the at least one controller further obtains current environmental information of the geolocation, and controls to depict the objects on the display in the geolocation according to the current environmental information.

27. The apparatus of claim 26, wherein the environmental information comprises at least one of a temperature, a wind direction, a wind speed, a date, a time, a current cloud cover, currently falling precipitation, recent precipitation, information of flora common to the geolocation, and information of road maintenance or closures.

28. The apparatus of claim 27, wherein at least one object is depicted moving according to the wind direction and wind speed.

29. The apparatus of claim 17, wherein one or more of the geolocation, date, time, and faced direction may be entered by a user.

30. The apparatus of claim 29, wherein if any of the geolocation, date, time, and faced direction are not entered by the user, then the light source, shading, and shadows are determined according to the respective current location, date, time, or faced direction of the apparatus instead.

31. The apparatus of claim 17, wherein the objects comprise at least one virtual object not known to be physically present at the geolocation, date, and time.

32. The apparatus of claim 17, wherein at least one of the one or more objects is depicted highlighted according to criteria entered by a user.

* * * * *